Patented Aug. 3, 1937

2,089,006

UNITED STATES PATENT OFFICE 2,089,006

PREPARATION OF NITRO-BENZALDIMER-CURIC OXIDES

Louis Spiegler, Woodbury, N. J., assignor to E. I. du Pont de Nemours & Company, Wilmington, Del., a corporation of Delaware No Drawing. Application January 24, 1936, Serial No. 60,635

6 Claims. (Cl. 260—13)

This invention relates to an improved process for the preparation of 2-nitro-benzaldimercuric oxide and its halogen derivatives.

In the preparation of 2-nitro-benzaldimercuric oxide as disclosed in Ber. V. 40, p. 4216, and in the preparation of 6-chloro-2-nitro-benzaldimercuric oxide more particularly described in U. S. Patent 1,996,006, an alkali concentration of from 1.65 to 1.8% was used in the condensation of the nitro-toluene compound with mercuric oxide. Under the conditions used it was found that a relatively pure mercuric oxide which contains substantially no trace of sodium chloride must be employed, for the presence of even small amounts of sodium chloride causes coagulation of the reacting ingredients, resulting in poor yields of the desired product and an increase in the time required to complete the reaction. While good yields of the desired product may be obtained when substantially chloride free mercuric oxide is employed, the preparation of this pure mercuric oxide is tedious and costly.

It has now been found that when the alkali concentration of the reaction mass is increased to about 3 to 4% alkali, the condensation of the freshly precipitated mercuric oxide with the nitro-toluene compound proceeds more rapidly, and the mercuric oxide used may contain substantial amounts of sodium chloride. When the higher concentration of alkali is used for the condensation, it has been found that as high as 1 to 1½% of sodium chloride may be present in the reaction mass without detrimentally affecting the yield or quality of the resulting product. It is therefore possible to use a crude mercuric oxide, thereby eliminating the purification heretofore found to be necessary.

The following examples are given to more fully illustrate the invention, in which the parts and percentages used are by weight:

Example 1

997 parts of freshly precipitated mercuric oxide are slurried in 9 liters of water. To this are added 298 parts of 100% sodium hydroxide (as a 41–47% solution) and the mass is heated to about 95–99° C. At this temperature 309 parts of ortho-nitro-toluene are added over a period of from 8 to 15 hours, and the reaction continued at about 95–98° C. until substantially all of the ortho-nitro-toluene has been condensed. The resulting 2-nitro-benzaldimercuric oxide is isolated by the usual filtration procedure.

Example 2

315 parts of 100% 6-chloro-2-nitro-toluene (crystallizing point of 34—34.4° C.) are slowly added to a slurry of 830 parts of freshly precipitated mercuric oxide (which has not been entirely freed from all sodium chloride) in 4700 parts of water at about 95–99° C. under agitation. The temperature may be maintained by the addition of steam directly into the reaction mass, in which case the alkali concentration should be kept at from about 3 to 4% by the addition of more alkali as needed. The reaction is continued until all of the 6-chloro-2-nitro-toluene has been completely reacted. The resulting 6-chloro-2-nitro-benzaldimercuric oxide is isolated by filtration.

While it is preferred to keep the alkali concentration at about 3.5%, this concentration may be varied to from 3 to 4% without materially altering the results. The volume of water in which the reaction is carried out may vary within wide limits so long as the alkali concentrations are maintained within the limits specified.

Either fresh, sublimed mercuric chloride dissolved in hydrochloric acid solution, or mercuric chloride solution as recovered from the reaction of the dinitrite compound of the nitro-benzaldimercuric oxides as described in U. S. Patent 1,996,007, can be employed for the preparation of the precipitated mercuric oxide. The recovered mercuric chloride, however, should be freed from excess organic impurities. This may be done by dilution and filtration or by the use of oxidizing agents. Where the recovered mercuric chloride contains appreciable amounts of iron salts, it is essential that the alkali concentration of the reaction mass be maintained well above 2%, preferably between 3 and 4%.

The mercuric oxide may be satisfactorily prepared by the following procedure:

310 parts of mercuric chloride (as a 29–30% solution in 14–15% hydrochloric acid) are slowly added over a period of 2 to 3 hours to a solution of 300 parts of sodium hydroxide dissolved in 3000 parts of water under agitation while the temperature is maintained below about 50° C. The mass is then diluted by the addition of 3000 parts of water, settled and decanted. The resulting settled mercuric oxide without further washing may be used directly in the processes outlined in the examples above given.

It is understood that other fixed alkalies, such as potassium, barium, etc., may be used in place of the sodium hydroxide specifically mentioned in the examples.

I claim:

1. In the process for preparing o-nitrobenzaldimercuric oxides wherein o-nitrotoluene is reacted with mercuric oxide, containing as an impurity some sodium chloride, in caustic alkali solution, the step which comprises carrying out the reaction in an alkali concentration of from 3 to 4%.

2. In the process for preparing o-nitrobenzaldimercuric oxides wherein an o-nitrotoluene is reacted with mercuric oxide in caustic alkali solution and wherein the mercuric oxide has been freshly precipitated from a solution of mercuric chloride, the step which comprises carrying out the reaction in an alkali concentration of from 3 to 4%.

3. In the process for preparing 2-chloro-6-nitro-benzaldimercuric oxide, the step which comprises reacting 2-chloro-6-nitrotoluene with mercuric oxide, containing as an impurity some sodium chloride, in a caustic alkali solution which contains from 3 to 4% alkali.

4. In the process for preparing 6-nitrobenzaldimercuric oxide, the step which comprises reacting 6-nitrotoluene with mercuric oxide, containing some sodium chloride as an impurity, in a caustic alkali solution which contains from 3 to 4% alkali.

5. In the process for preparing 2-chloro-6-nitro-benzaldimercuric oxide, the step which comprises reacting 2-chloro-6-nitrotoluene with mercuric oxide in a 3.5% caustic alkali solution, the mercuric oxide being freshly precipitated from a solution of mercuric chloride.

6. In the process for preparing 6-nitrobenzaldimercuric oxide, the step which comprises reacting 6-nitrotoluene with mercuric oxide in a 3.5% caustic alkali solution, the mercuric oxide being freshly precipitated from a solution of mercuric chloride.

LOUIS SPIEGLER.